US012196103B2

(12) United States Patent
Sakakibara et al.

(10) Patent No.: US 12,196,103 B2
(45) Date of Patent: Jan. 14, 2025

(54) RADIAL TURBINE IMPELLER

(71) Applicant: HONDA MOTOR CO., LTD., Tokyo (JP)

(72) Inventors: Takashi Sakakibara, Saitama (JP); Naoki Kuno, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 6 days.

(21) Appl. No.: 18/531,986

(22) Filed: Dec. 7, 2023

(65) Prior Publication Data

US 2024/0271530 A1 Aug. 15, 2024

(30) Foreign Application Priority Data

Feb. 14, 2023 (JP) ................................ 2023-020553

(51) Int. Cl.
*F01D 5/04* (2006.01)

(52) U.S. Cl.
CPC .......... *F01D 5/04* (2013.01); *F05D 2240/307* (2013.01)

(58) Field of Classification Search
CPC ...... F01D 5/04; F01D 5/048; F05D 2240/307; F05D 2220/40; F04D 29/162
See application file for complete search history.

(56) References Cited

U.S. PATENT DOCUMENTS

| | | | | |
|---|---|---|---|---|
| 8,523,530 | B2 * | 9/2013 | Merritt | F01D 5/048 416/243 |
| 8,608,433 | B2 * | 12/2013 | Lombard | F01D 5/048 415/157 |
| 10,563,515 | B2 * | 2/2020 | Yokoyama | F01D 5/141 |
| 2007/0231141 | A1 * | 10/2007 | Chaing | F01D 5/16 416/185 |
| 2017/0298737 | A1 | 10/2017 | Kuno et al. | |
| 2017/0298819 | A1 | 10/2017 | Kuno et al. | |
| 2018/0010464 | A1 * | 1/2018 | Yokoyama | F01D 5/14 |

FOREIGN PATENT DOCUMENTS

| | | | |
|---|---|---|---|
| JP | 2011117344 | A | 6/2011 |
| JP | 2017193984 | A | 10/2017 |
| JP | 2017193985 | A | 10/2017 |

* cited by examiner

*Primary Examiner* — Courtney D Heinle
*Assistant Examiner* — Andrew Thanh Bui
(74) *Attorney, Agent, or Firm* — Armstrong Teasdale LLP

(57) ABSTRACT

A radial turbine impeller includes full blades and splitter blades arranged alternately in the rotational direction of the radial turbine impeller, the splitter blades having a shorter blade length in a fluid flow direction in the radial turbine impeller than the full blades. A throat is provided between each two of the full blades adjacent to each other in the rotational direction. A part of a downstream edge of each splitter blade on a side of a base edge which is joined to an outer peripheral surface of a hub is positioned upstream of the throat, and a part of the downstream edge of each splitter blade on a side of a tip edge which is remote from the outer peripheral surface of the hub is positioned downstream of the part of the downstream edge on the side of the base edge.

4 Claims, 9 Drawing Sheets

RADIAL TURBINE IMPELLER

TECHNICAL FIELD

The present invention relates to a radial turbine impeller.

BACKGROUND ART

In a radial turbine used in a turbine machine, which typically is a gas turbine engine, a compressed fluid, such as a compressed high-temperature gas, is supplied to a turbine impeller from a turbine nozzle defined by stator blades (vanes). The compressed fluid expands in volume and the flow velocity thereof increases when passing the turbine nozzle, whereby the compressed fluid supplied to the turbine impeller rotates the turbine impeller at a high speed.

To make the turbine impeller produce more work, it is necessary to cause a greater amount of compressed fluid to flow between the turbine blades (turbine vanes) of the turbine impeller. As the flow rate of the compressed fluid flowing between the turbine blades increases, the load applied to each turbine blade increases. In addition, the compressed fluid flowing between the turbine blades has a high temperature. Therefore, it is necessary for the turbine blades to have sufficient strength.

Regarding this matter, it has been proposed to increase the adiabatic efficiency of the turbine by increasing the number of blades disposed on the turbine impeller and/or increasing the blade height, and to ensure the necessary strength by increasing the blade thickness. However, when the number of turbine blades having a large thickness is increased, the outlet area between the turbine blades adjacent to each other in the rotational direction of the turbine becomes small, and this adversely affects the adiabatic efficiency of the turbine. Also, in order for the hub to support the turbine blades with sufficient strength, it is necessary to increase the turbine blade thickness near the root (base edge) or the radius of curvature of the fillet. This can result in interference between the fillets of adjacent turbine blades, and thus, there is a limit to increasing the number of turbine blades.

As a turbine impeller that solves the above problems and satisfies the above requirements, there is proposed a radial turbine impeller including full blades (long blades) which have a long blade length and splitter blades (short blades) which have a short blade length (see JP2011-117344A, JP2017-193984A, and JP2017-193985A, for example).

In such a radial turbine impeller, on the compressed fluid inlet side (high load side), the full blades and the splitter blades are arranged alternately to increase the number of blades so that the load applied to each blade is reduced and the adiabatic efficiency is improved. On the outlet side (low load side), specifically, at the throat defined between each adjacent full blades, only the full blades are present, and thus, the inter-blade interval in the rotational direction of the impeller is ensured and the interference between the fillets of the adjacent blades is avoided.

In the above radial turbine, the blade length of each splitter blade is set such that the splitter blade is not present in the throat defined between the full blades, and therefore, the splitter blade cannot be made sufficiently long, and it is difficult to effectively enhance the adiabatic efficiency.

If the blade length of each splitter blade is long, the splitter blade interferes with the throat, so that the throat area is not ensured sufficiently and it is difficult to enhance the adiabatic efficiency.

SUMMARY OF THE INVENTION

In view of the foregoing background, a primary object of the present invention is to provide a radial turbine impeller with an improved design of the splitter blades to reduce the blade load and to improve the adiabatic efficiency of the turbine.

To achieve the above object, one aspect of the present invention provides a radial turbine impeller (58) comprising a hub (70) having a substantially conical shape and multiple turbine blades provided on an outer peripheral surface (70A) of the hub at intervals in a rotational direction, wherein the turbine blades include full blades (80) and splitter blades (90) arranged alternately in the rotational direction of the radial turbine impeller, the splitter blades having a shorter blade length in a fluid flow direction (F) in the radial turbine impeller than the full blades, a throat (S) is provided between each two of the full blades adjacent to each other in the rotational direction, and a part of a downstream edge (90B) of each splitter blade on a side of a base edge (90C) which is joined to the outer peripheral surface of the hub is positioned upstream of the throat, and a part of the downstream edge of each splitter blade on a side of a tip edge (90D) which is remote from the outer peripheral surface of the hub is positioned downstream of the part of the downstream edge on the side of the base edge.

According to this aspect, on the side of the tip edge where the load is high, the blade length of the splitter blade is long so that the blade load per length is reduced, and on the side of the base edge, the splitter blade does not interfere with the throat, whereby the influence on the throat area is suppressed and the adiabatic efficiency of the radial turbine is improved.

Preferably, the part of the downstream edge of each splitter blade on the side of the tip edge is positioned downstream of the throat.

According to this aspect, the blade length of the splitter blade on the side of the tip edge becomes sufficiently long, whereby the blade load per length is effectively reduced, and the adiabatic efficiency of the radial turbine is effectively improved.

Preferably, the throat includes a first throat part (S1) defined between the full blades adjacent to each other in the rotational direction on a side of base edges (80C) of the full blades which are joined to the outer peripheral surface of the hub, and two second throat parts (S2) defined on a side of tip edges (80D) of the full blades which are remote from the outer peripheral surface of the hub such that each second throat part is defined between one of the full blades adjacent to each other in the rotational direction and the splitter blade located between the full blades.

According to this aspect, a sufficient throat area is achieved by the first throat part and the second throat parts, and the adiabatic efficiency of the radial turbine is improved.

Preferably, when a ratio of a height from the base edge of the splitter blade at the downstream edge to an overall blade height from the base edge to the tip edge of the splitter blade at the downstream edge is represented by a value from 0 to 1.0, the second throat parts are defined within a range of the ratio from 0.5 to 1.0.

According to this aspect, on the side of the base edge where the blade thickness is large, the splitter blade does not interfere with the first throat part, whereby a sufficient throat area of the first throat part is achieved, and the adiabatic efficiency of the radial turbine is improved.

Preferably, a ratio Rp of a dimension Ls of a part of the tip edge of the splitter blade protruding from the throat in the downstream direction to a dimension Lf of a part of the tip edge of the full blade extending from the throat in a downstream direction is greater than 0 and less than or equal to 0.3 ($0<Rp<0.3$).

According to this aspect, it is possible to prevent a part of the downstream edge of the splitter blade from becoming conspicuously long, while increasing the blade area so that the adiabatic efficiency of the radial turbine is improved.

According to the foregoing aspect, the blade load is reduced and the adiabatic efficiency of the radial turbine is improved.

DETAILED DESCRIPTION OF THE INVENTION

In the following, embodiments of the present invention will be described with reference to the drawings.

Figure 1:
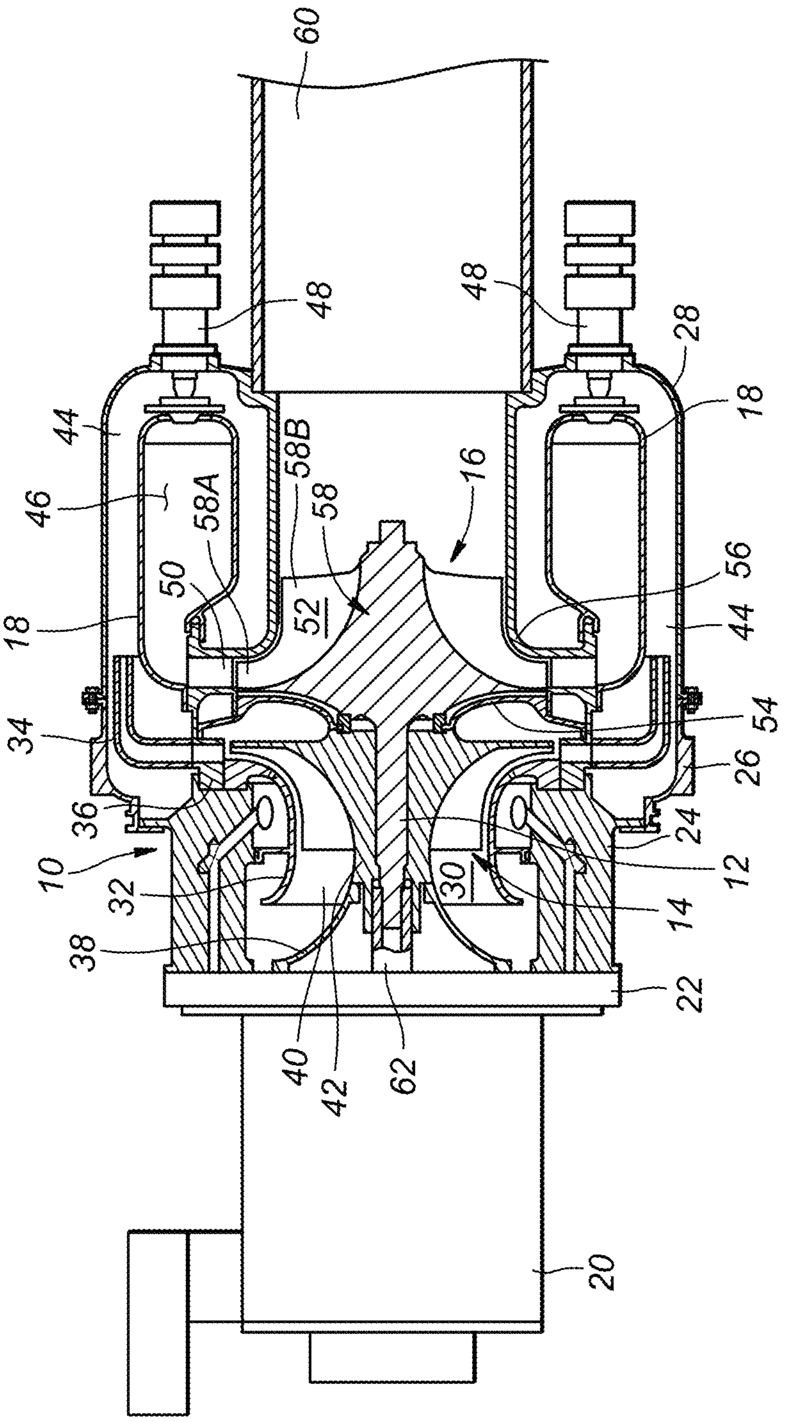
FIG. 1 is a sectional view of a gas turbine system for power generation provided with a radial turbine impeller.

FIG. 1 is a sectional view of a gas turbine system 10 for power generation provided with a radial turbine impeller 58 according to the present embodiment. As shown in FIG. 1, the gas turbine system 10 for power generation includes a radial compressor 14 and a radial turbine 16 which are coaxially connected to each other by a rotation shaft 12, combustors 18, and an electric generator 20 connected to the rotation shaft 12.

The gas turbine system 10 for power generation includes a front end plate 22, a front housing 24, an intermediate housing 26, and a rear housing 28 which are connected to each other in the axial direction in order.

The radial compressor 14 includes a compressor housing 32 mounted to the front housing 24 and defining a compressor chamber 30, a diffuser fixing member 36 mounted to the front housing 24 and fixing a diffuser 34, and an air intake guide member 38 mounted to the front end plate 22. The air intake guide member 38 cooperates with the compressor housing 32 to define an air intake 40. In the compressor chamber 30, a compressor impeller 42 mounted on the rotation shaft 12 is rotatably disposed. The compressor impeller 42 is rotationally driven by the rotation shaft 12 which is an output shaft of the radial turbine 16. On the diffuser fixing member 36, the diffuser 34 is mounted.

The radial compressor 14 takes in air (outside air) through the air intake 40, compresses and pressurizes the air by the rotation of the compressor impeller 42, and supplies the compressed and pressurized air (compressed air) to the diffuser 34.

In the rear housing 28, the combustors 18 are provided around the central axis of the rotation shaft 12. The rear housing 28 includes parts that define compressed air passages 44 for guiding the compressed air from the diffuser 34 to the respective combustors 18. Each combustor 18 defines a combustion chamber 46. Each combustor 18 has a fuel injection nozzle 48 mounted thereon. The fuel injection nozzle 48 injects fuel into the combustion chamber 46.

In each combustion chamber 46, the mixture of the fuel injected into the combustion chamber 46 by the fuel injection nozzle 48 and the compressed air from the radial compressor 14 combusts, and a high-pressure combustion gas (compressed fluid) is generated. A turbine nozzle 50 of the radial turbine 16 is provided at gas outlets of the combustors 18.

The radial turbine 16 includes a turbine chamber 52 defined by an inner part of the rear housing 28 and communicating with the gas outlet of each combustor 18. The turbine chamber 52 is separated from the compressor chamber 30 by a partition wall member 54. A side of the turbine chamber 52 opposite from the partition wall member 54 is defined by a shroud 56. In the turbine chamber 52, the radial turbine impeller 58 integrally including the rotation shaft 12 is rotatably disposed.

The turbine nozzle 50 has a circular annular shape so as to surround the radial turbine impeller 58, and ejects the combustion gas radially inward and circumferentially toward the radial turbine impeller 58. The radial turbine impeller 58 is rotationally driven by the combustion gas ejected from the turbine nozzle 50. The combustion gas that has rotationally driven the radial turbine impeller 58 is discharged from an exhaust gas passage 60 to the atmosphere as an exhaust gas.

The rotation shaft 12 is connected to a rotor shaft 62 of the electric generator 20. Thereby, the electric generator 20 is rotationally driven by the rotation shaft 12 of the radial turbine 16 and generates electricity.

Next, details of the radial turbine impeller 58 will be described with reference to FIGS. 2 to 8.

Figure 2:
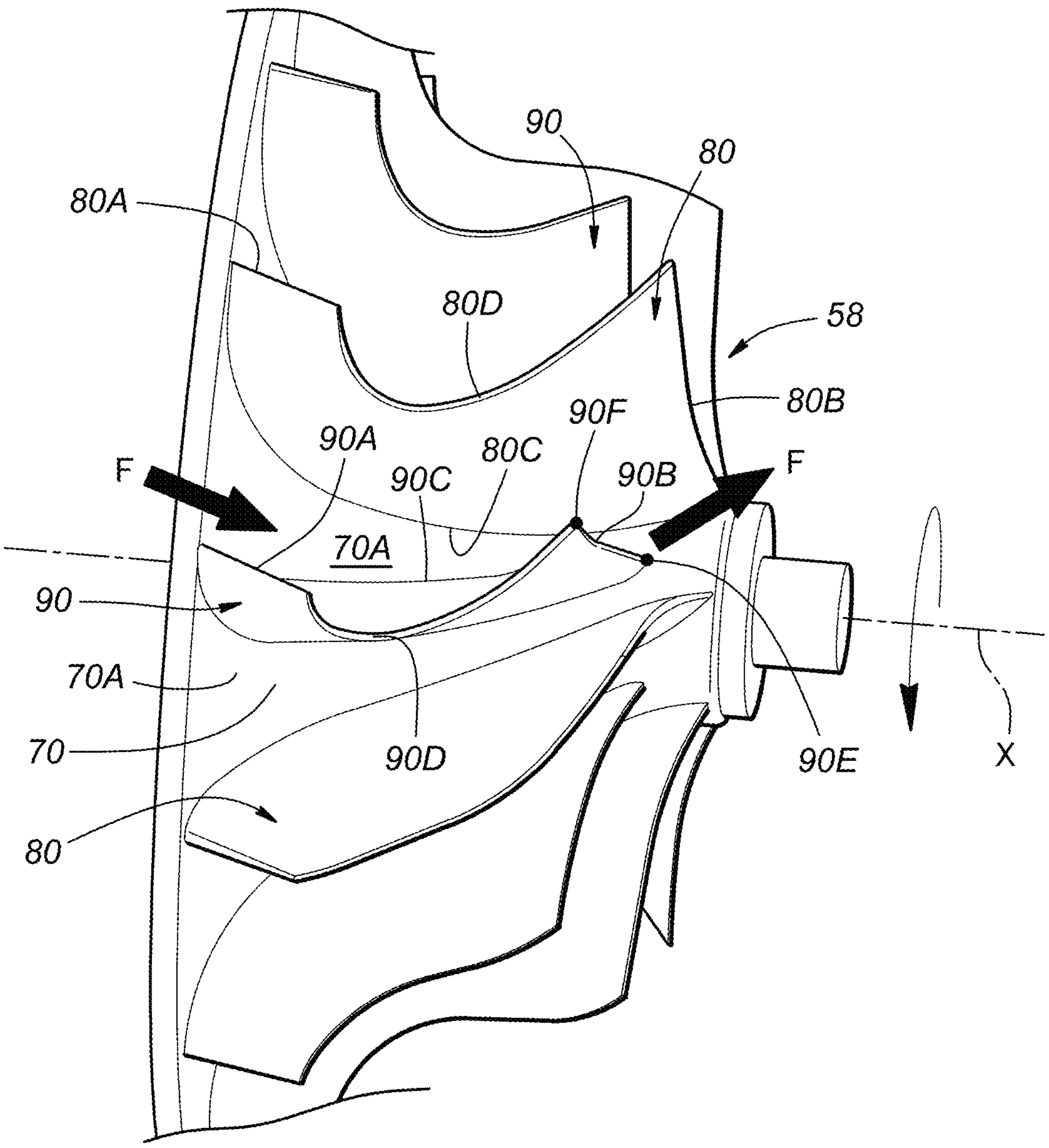
FIG. 2 is a perspective view of a radial turbine impeller according to the embodiment as viewed from a side.
Figure 3:
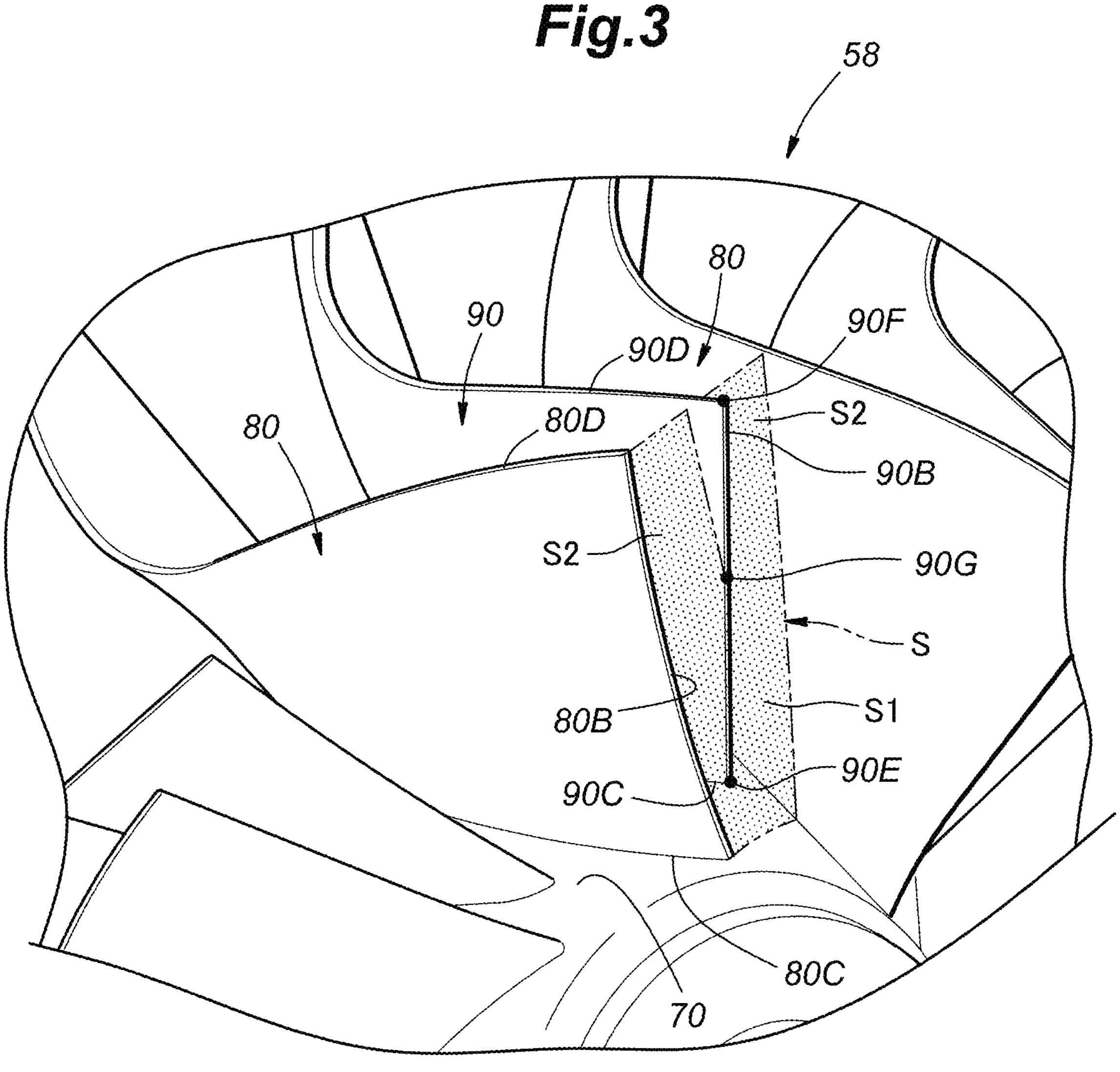
FIG. 3 is a perspective view the radial turbine impeller according to the embodiment as viewed from a downstream side.
Figure 4:
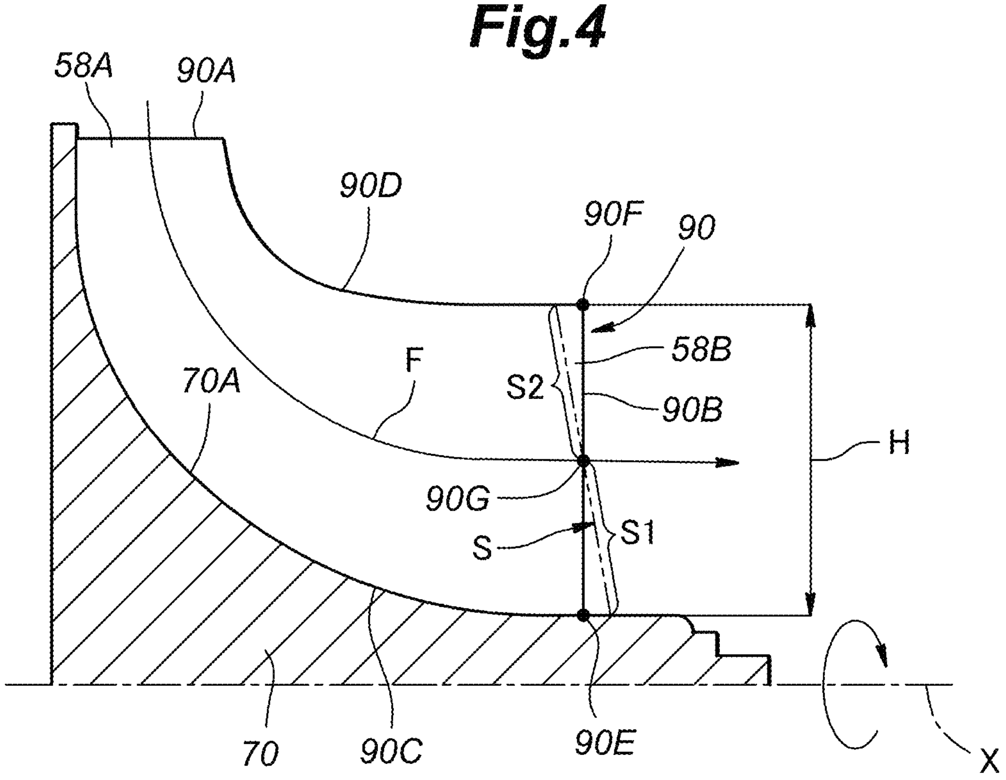
FIG. 4 is a meridian cross-sectional view of a splitter blade of the radial turbine impeller according to the embodiment.

As shown in FIGS. 2 to 4, the radial turbine impeller 58 (may be simply referred to as the turbine impeller 58 in the following description) includes a hub 70 having a substantially conical shape, and multiple full blades 80 and splitter blades 90 provided on an outer peripheral surface 70A of the hub 70 at intervals in the rotational direction of the turbine impeller 58. In the following description, the full blades 80 and the splitter blades 90 may be collectively referred to as the turbine blades.

The full blades 80 and the splitter blades 90 are disposed alternately in the rotational direction of the turbine impeller 58.

The rotational direction of the turbine impeller 58 is a counterclockwise direction in FIG. 2. In the following description, the rotational direction of the turbine impeller 58 may be simply referred to as the rotational direction.

Each full blade 80 extends over the substantially entire length of the outer peripheral surface 70A of the hub 70 in the generatrix direction, namely, extends from a fluid inlet end 58A to a fluid outlet end 58B of the turbine impeller 58.

The fluid inlet end 58A of the turbine impeller 58 is located in a position corresponding to the turbine nozzle 50 (see FIG. 1). The fluid outlet end 58B of the turbine impeller 58 is located in a position corresponding to the exhaust gas passage 60 (see FIG. 1).

Each full blade 80 has an upstream edge (leading edge) 80A positioned in the fluid inlet end 58A, a downstream edge (trailing edge) 80B positioned in the fluid outlet end 58B, a base edge (root edge) 80C joined to the outer peripheral surface 70A of the hub 70 and extending along the outer peripheral surface 70A between the upstream edge 80A and the downstream edge 80B, and a tip edge 80D which is remote from the outer peripheral surface 70A of the hub 70 and extends along the inner peripheral surface of the shroud 56 (see FIG. 1) between the upstream edge 80A and the downstream edge 80B.

Each splitter blade 90 has an upstream edge (leading edge) 90A positioned at the fluid inlet end 58A of the turbine impeller 58, a downstream edge (trailing edge) 90B positioned at the fluid outlet end 58B of the turbine impeller 58, a base edge (root edge) 90C joined to the outer peripheral surface 70A of the hub 70 and extending along the outer peripheral surface 70A between the upstream edge 90A and the downstream edge 90B, and a tip edge 90D which is remote from the outer peripheral surface 70A of the hub 70 and extends along the inner peripheral surface of the shroud 56 (see FIG. 1) between the upstream edge 90A and the downstream edge 90B.

Figure 5:
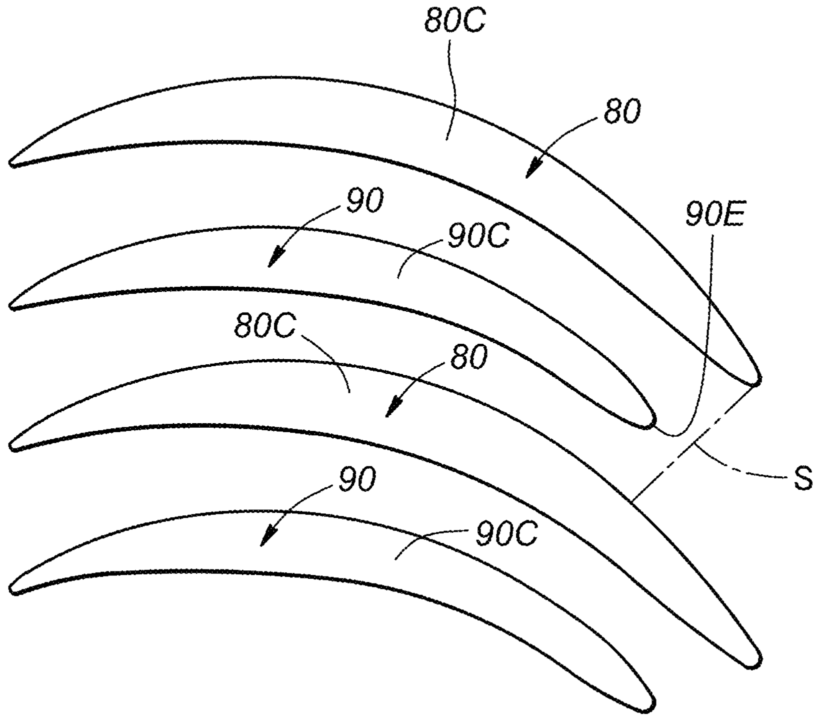
FIG. 5 is an explanatory diagram showing a blade arrangement of the radial turbine impeller according to the embodiment on the side of base edges of the blades.
Figure 6:
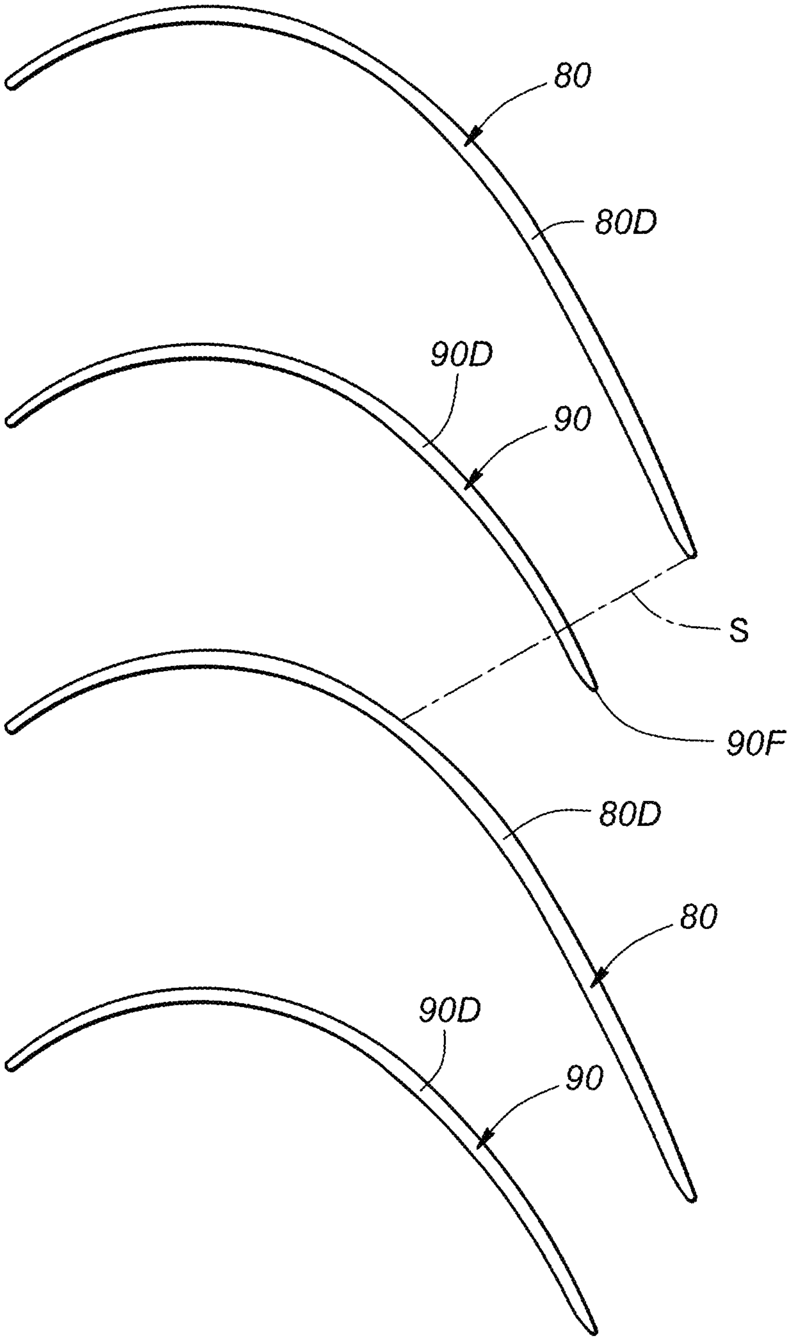
FIG. 6 is an explanatory diagram showing a blade arrangement of the radial turbine impeller according to the embodiment on the side of tip edges of the blades.

The base edge 80C of each full blade 80 and the base edge 90C of each splitter blade 90 shown in FIG. 5 have larger blade thicknesses than the respective tip edges 80D and 90D shown in FIG. 6.

As shown in FIG. 3, a throat S is defined between each two of the full blades 80 adjacent to each other in the rotational direction of the turbine impeller 58 such that the throat S is located near the downstream edges 80B of the full blades 80. The throat S is the narrowest part between the adjacent full blades 80. The throat S has a planar shape intersecting with a flow direction F (see FIG. 4) of the compressed fluid flowing between the turbine blades.

As shown in FIGS. 3 and 4, the downstream edge (trailing edge) 90B of the splitter blade 90 is inclined relative to the throat S such that a part thereof on the side of the base edge 90C is positioned upstream of the throat S and a part thereof on the side of the tip edge 90D is positioned downstream of the part on the side of the base edge 90C, preferably, downstream of the throat S. As a result, the tip edge 90D of the splitter blade 90 extends to cross the throat S. An intersection 90E between the downstream edge 90B and the base edge 90C of the splitter blade 90 is positioned upstream of the throat S, while an intersection 90F between the downstream edge 90B and the tip edge 90D of the splitter blade 90 is positioned downstream of the throat S.

The throat S includes one first throat part 51 defined between the full blades 80 adjacent to each other in the rotational direction on the side of the base edges 80C of the full blades 80 and two second throat parts S2 each defined on the side of the tip edges 80D of the full blades 80 such that each second throat part S2 is defined between one of the full blades 80 adjacent to each other in the rotational direction and the splitter blade 90 located therebetween. In other words, the two second throat parts S2 are defined on either side of the splitter blade 90.

Therefore, on the side of the tip edge 90D where the load is high, the blade length of the splitter blade 90 is long so that the blade load per length is reduced, while on the side of the base edge 90C, the splitter blade 90 does not interfere with the throat S, whereby the influence on the throat area is suppressed and a sufficient throat area is achieved by the first throat part S1 and the second throat parts S2, and the adiabatic efficiency of the radial turbine 16 is improved.

When a ratio Rs of a height from the base edge 90C of the splitter blade 90 at the downstream edge 90B to an overall blade height H (see FIG. 4) of the splitter blade 90 from the base edge 90C to the tip edge 90D at the downstream edge 90B is represented by a value from 0 to 1.0, it is preferred if the second throat parts S2 are defined within a range of the ratio Rs from 0.5 to 1.0 in order to obtain the above-described effects. In other words, a point 90G (see FIG. 4) where the downstream edge 90B of the splitter blade 90 intersects with the throat S is preferably positioned at a height from the base edge 90C that is higher than or equal to a half of the overall blade height H and lower than the overall blade height H in order to obtain the above-described effects.

Figure 7:
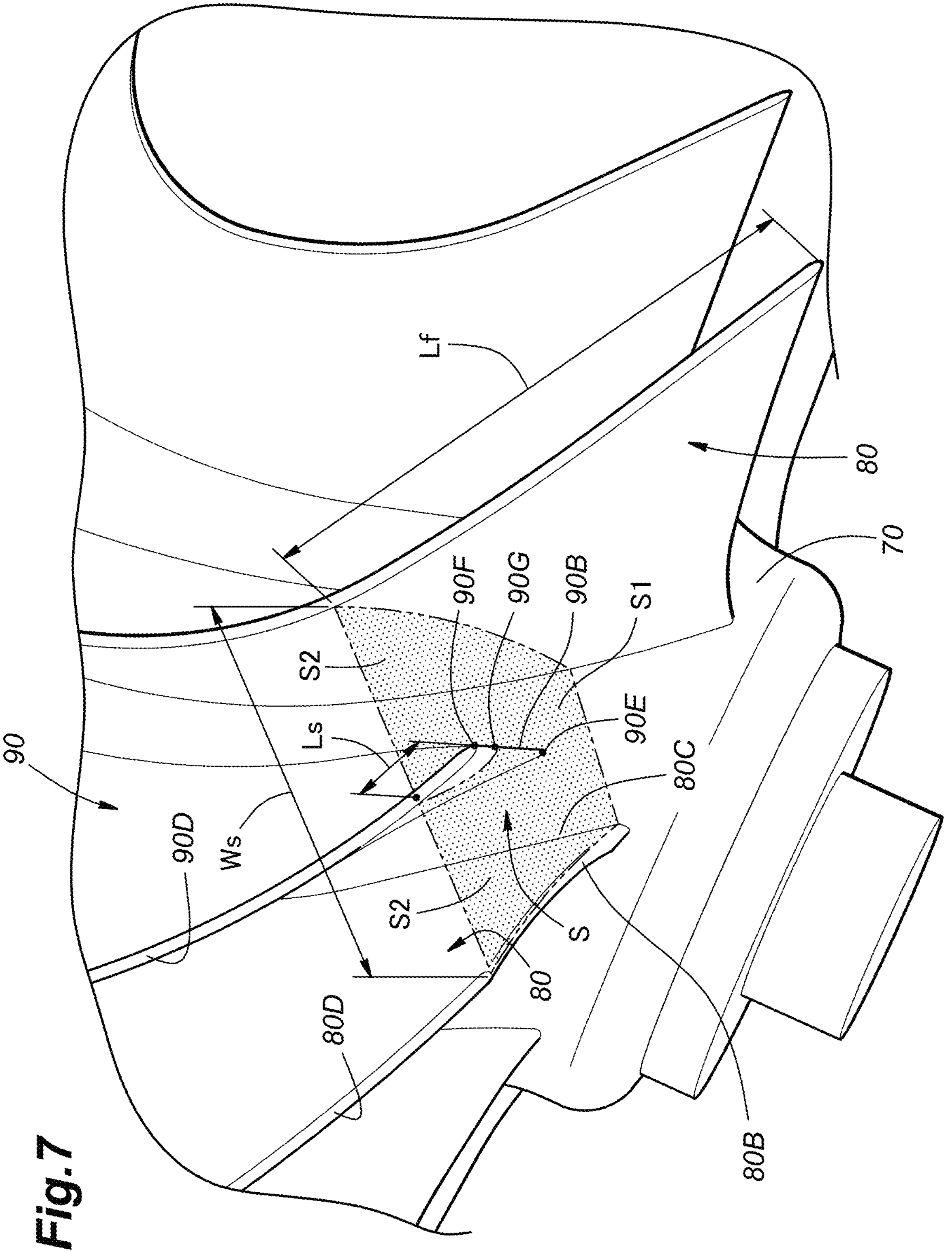
FIG. 7 is a perspective view of a main part of the radial turbine impeller according to the embodiment as viewed from radially outer side.
Figure 8:
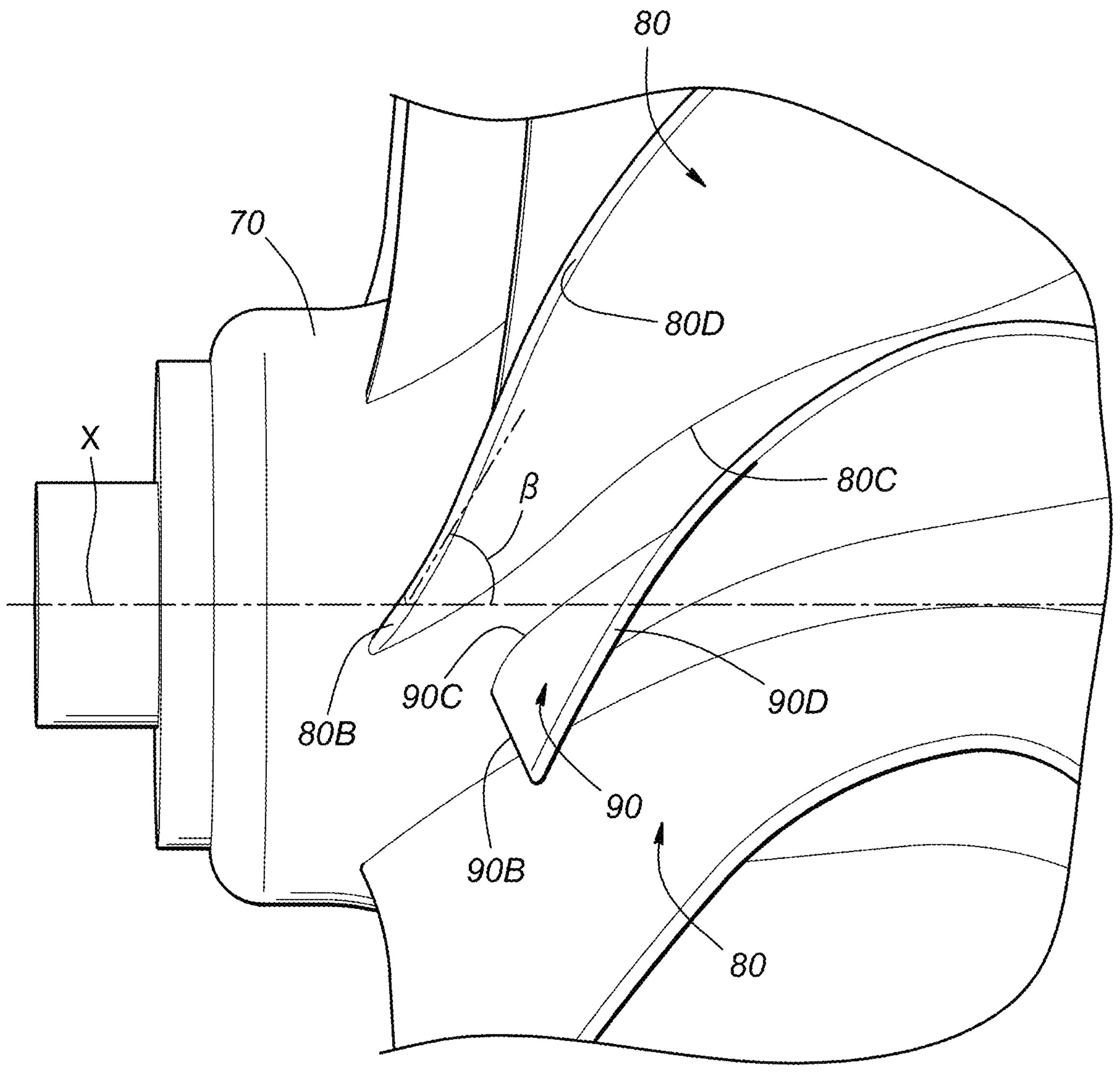
FIG. 8 is a perspective view of the main part of the radial turbine impeller according to the embodiment as viewed from a side.

As shown in FIG. 7, when a dimension of a part of the tip edge 90D of the splitter blade 90 protruding from the throat S in the downstream direction is represented by Ls, and a dimension of a part of the tip edge 80D of the full blade 80 extending from the throat S in the downstream direction is represented by Lf, a ratio Rp of the dimension Ls to the dimension Lf preferably is greater than zero and less than or equal to 0.3 ($0<Rp\leq 0.3$). Note that when the minimum inter-blade dimension between the tip edges 80D of the adjacent full blades 80 (the inter-blade dimension between the tip edges 80D of the full blades 80 at the throat S) is represented by Ws, and a value of an angle β formed between the full blade 80 and the rotation axis X of the radial turbine 16 in one projection surface at the fluid the outlet part is represented by βo (see FIG. 8), the dimension Lf can be approximated by Ws·tan βo, and thus, the ratio Rp may be approximately represented by the following formula (1).

$$Rp = Ls/(Ws \cdot \tan\beta o) \tag{1}$$

If the ratio Rp=0, the tip edge 90D of the splitter blade 90 does not protrude from the throat S, and thus, the above-described effect cannot be obtained. If the ratio Rp exceeds 0.3 (30%), the blade area is increased and this may improve the adiabatic efficiency, but a part of the downstream edge 90B of the splitter blade 90 becomes conspicuously long, and hence, it becomes difficult to manufacture the blade and to achieve high durability. If a part of each splitter blade 90 on the side of the base edge 90C is also extended toward the fluid outlet end 58B, the arrangement of the full blades 80 and the splitter blades 90 becomes dense, whereby a problem may occur that the fillets of adjacent full blades 80 and splitter blades 90 interfere with each other, and the throat area becomes small so that the necessary flow rate cannot be achieved.

Figure 9:
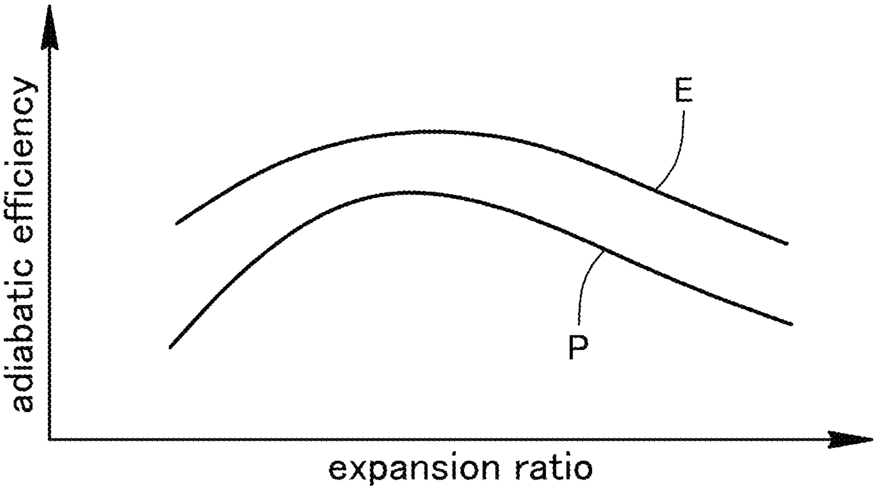
FIG. 9 is a graph showing the adiabatic efficiency-expansion ratio characteristics of the radial turbine.

FIG. 9 is a graph showing the adiabatic efficiency-expansion rate characteristics of the radial turbine 16 according to the present embodiment and a radial turbine according to the conventional example. In FIG. 9, a characteristics curve E represents the adiabatic efficiency characteristics of the present embodiment, and a characteristics curve P represents the adiabatic efficiency characteristics of the conventional example.

From the comparison between the characteristics curve E and the characteristics curve P, it can be seen that in the radial turbine 16 of the present embodiment, the adiabatic efficiency is improved over a wide range of expansion ratio compared to the conventional example.

Concrete embodiments of the present invention have been described in the foregoing, but the present invention is not limited to the above embodiments and may be modified or altered in various ways. For example, the shape of the hub 70 and the number of the full blades 80 and the splitter blades 90 may be changed as appropriate. The radial turbine impeller 58 of the present embodiment is not limited to the impeller of the radial turbine 16 of the gas turbine system 10 for power generation, and may be used as an impeller of various radial turbines.

The invention claimed is:

1. A radial turbine impeller comprising a hub having a substantially conical shape and multiple turbine blades provided on an outer peripheral surface of the hub at intervals in a rotational direction, wherein the turbine blades include full blades and splitter blades arranged alternately in the rotational direction of the radial turbine impeller, the splitter blades having a shorter blade length in a fluid flow direction in the radial turbine impeller than the full blades, a throat is provided between each two of the full blades adjacent to each other in the rotational direction, and a part of a downstream edge of each splitter blade on a side of a base edge which is joined to the outer peripheral surface of the hub is positioned upstream of the throat, and a part of the downstream edge of each splitter blade on a side of a tip edge which is remote from the outer peripheral surface of the hub is positioned downstream of the part of the downstream edge on the side of the base edge, wherein the part of the downstream edge of each splitter blade on the side of the tip edge is positioned downstream of the throat.

2. The radial turbine impeller according to claim 1, wherein the throat includes a first throat part defined between the full blades adjacent to each other in the rotational direction on a side of base edges of the full blades which are joined to the outer peripheral surface of the hub, and two second throat parts defined on a side of tip edges of the full blades which are remote from the outer peripheral surface of the hub such that each second throat part is defined between one of the full blades adjacent to each other in the rotational direction and the splitter blade located between the full blades.

3. The radial turbine impeller according to claim 2, wherein when a ratio of a height from the base edge of the splitter blade at the downstream edge to an overall blade height from the base edge to the tip edge of the splitter blade at the downstream edge is represented by a value from 0 to 1.0, the second throat parts are defined within a range of the ratio from 0.5 to 1.0.

4. The radial turbine impeller according to claim 2, wherein a ratio Rp of a dimension Ls of a part of the tip edge of the splitter blade protruding from the throat in the downstream direction to a dimension Lf of a part of the tip edge of the full blade extending from the throat in a downstream direction is greater than 0 and less than or equal to 0.3 ($0<Rp\leq 0.3$).

* * * * *